United States Patent [19]

Fields et al.

[11] Patent Number: 5,299,115
[45] Date of Patent: Mar. 29, 1994

[54] PRODUCT DEMAND SYSTEM AND METHOD

[75] Inventors: Randall K. Fields, Woodland; Paul R. Quinn, Park City; Barrie R. Tondevold, Murray, all of Utah

[73] Assignee: Mrs. Fields Software Group Inc., Park City, Utah

[21] Appl. No.: 15,032

[22] Filed: Feb. 5, 1993

Related U.S. Application Data

[63] Continuation of Ser. No. 808,982, Dec. 17, 1991, abandoned, which is a continuation of Ser. No. 406,069, Sep. 12, 1989, abandoned.

[51] Int. Cl.⁵ ............... G06F 15/22; G06F 15/24; G06G 7/52
[52] U.S. Cl. .................... 364/401; 364/468
[58] Field of Search .............. 364/401, 403, 468

[56] References Cited

U.S. PATENT DOCUMENTS

| | | | |
|---|---|---|---|
| 4,227,245 | 10/1980 | Edblad | 364/468 |
| 4,562,530 | 12/1985 | Umeda | 364/148 |
| 4,639,875 | 12/1987 | Abraham et al. | 364/403 |
| 4,661,912 | 4/1987 | Imanishi | 364/29 |
| 4,727,494 | 2/1988 | Buote | 364/901 |
| 4,737,910 | 12/1988 | Kaneko | 364/403 |
| 4,887,207 | 12/1989 | Natarajan | 364/468 |

FOREIGN PATENT DOCUMENTS

253553A 2/1990 Japan ..................... 364/468

Primary Examiner—Roy N. Envall, Jr.
Assistant Examiner—Laura Brutman
Attorney, Agent, or Firm—A. C. Smith

[57] ABSTRACT

A product-demand production-control system and method stores past-product demand data during past time periods for use with other data to compute product demands in such manner that the past-product demand data is used to estimate the product demands in current and near-future time periods. The system measures and stores the product demand data for a plurality of predetermined time periods and a plurality of products, and preestimates the product demand for a plurality of products for near-future time periods. Product-demand estimates for current and near-future time periods are revised for a plurality of products in response to weighted emphasis or confidence regarding product demand data in time periods just prior to the current time period.

28 Claims, 10 Drawing Sheets

| FIGURE 5A |
|---|
| FIGURE 5B |

*FIGURE 5*

| FIGURE 6A |
|---|
| FIGURE 6B |

PRODUCT DEMAND SYSTEM AND METHOD

RELATED APPLICATIONS

This is a continuation of co-pending application Ser. No. 07/808,982 filed on Dec. 17, 1991, now abandoned, which is a continuation of co-pending application Ser. No. 07/406,069 filed on Sep. 12, 1989, now abandoned.

BACKGROUND OF THE INVENTION

FIELD OF INVENTION

This invention relates to an improved system for the analysis and prediction of product demand.

For more efficient product planning in a retail environment given a plurality of products of short shelf life, a tendency exists toward resorting to production plans that are calculated on an infrequent basis. This basis is often daily at best and more often is based on an average for a given day of the week. This results in excessive product and waste or not enough product to meet customer demand. To expect a human being to calculate product demand on a more frequent basis such as hourly or every fifteen minutes would be impractical if not impossible.

In addition to the impracticality of computing product demand manually on a more frequent basis is the complexity introduced by different demand patterns for each day of the week and seasonality during the year. Customer foot traffic and product preferences are unique to each day of the week. These traffic patterns and preferences are further complicated by seasonality trends week by week throughout the year. Accommodating this level of complexity requires a unique solution to store the past-product demand by seasonality, day of the week, and time period during the day, for each of a plurality of products.

Another difficulty encountered once the past-product demand has been stored is the ability to deal with incomplete data from current time periods and to compare trends in just-completed time periods against preestimated demand in the same time periods in order to adjust near-future time periods accurately and with confidence. One method for making such comparisons and projections on other near-future periods is to take a simple positive or negative percentage of the trend of just-completed periods against preestimated periods and apply it to the remaining preestimated near future periods for the day. This method is unreliable given the many anomalies that can occur, for example, when a bus load of people arrives or an unusually large order is placed.

SUMMARY OF THE INVENTION

It is therefore an object of the present invention to obviate the above mentioned drawbacks of the prior-art systems and to provide a system and method for analyzing product demand which incorporates tracking of past-product demand for a plurality of products, time intervals during the day, and other factors, and which introduces a confidence factor into product trends. Accordingly, more appropriate and accurate pre-estimation of future-product demand can be made.

DESCRIPTION OF THE PREFERRED EMBODIMENT

Figure 1:
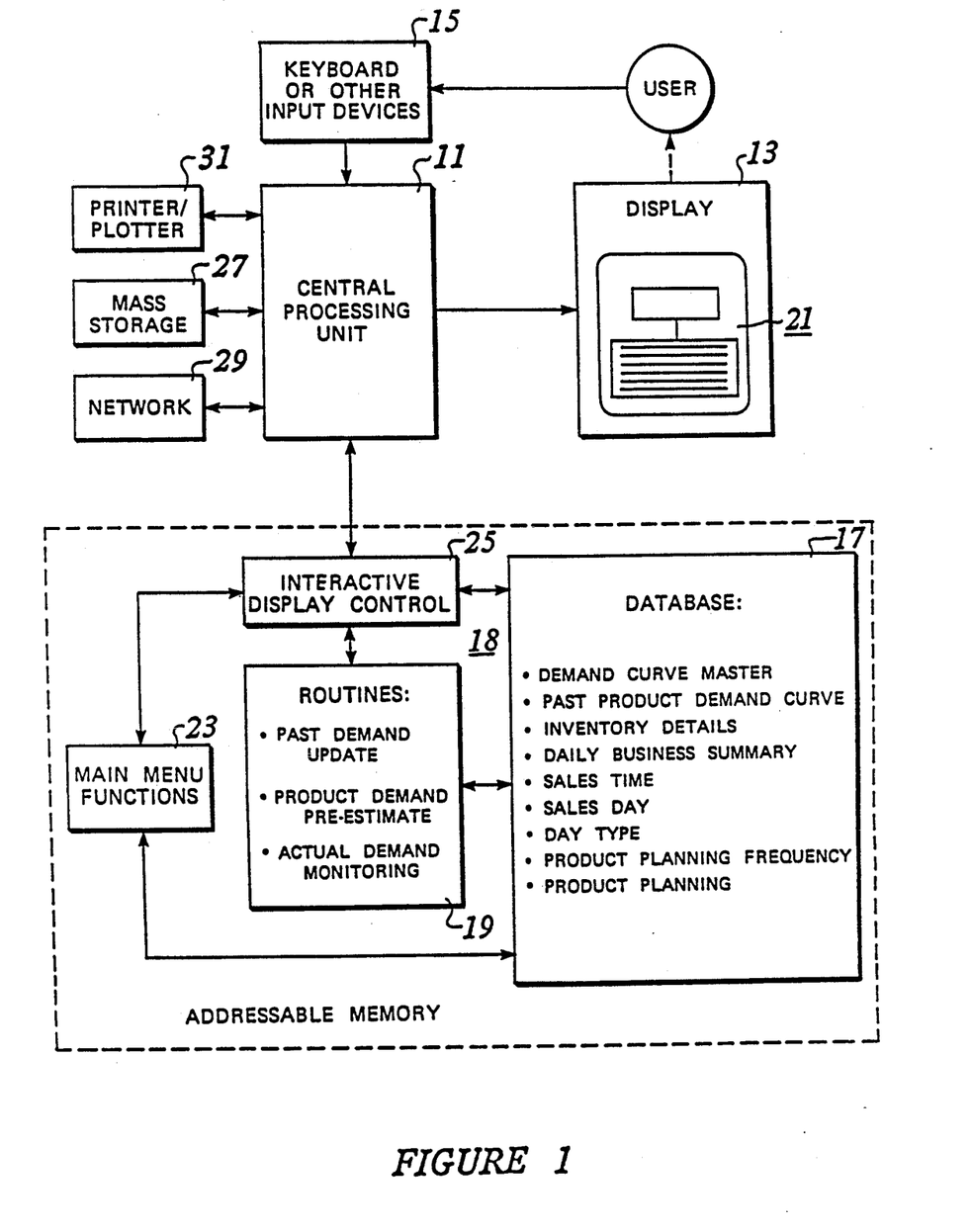
FIG. 1 is a block schematic diagram of a workstation for estimating production in accordance with the present invention.

Referring now to FIG. 1, there is shown a block schematic diagram of a workstation configured in accordance with one embodiment of the present invention to provide improved production scheduling for a plurality of products. Central processing unit (CPU) 11 is connected to control the display device 13 in response to inputs supplied to the CPU 11 via the user's manipulation of the keyboard 15, or via other inputs supplied through a conventional network interface 29 (e.g., modem, bar-code readers, standard network bus, and the like). The CPU 11 accesses memory 18 which contains information that is supplied via the keyboard 15 or the network 29 (e.g., RS232 bus connection to a point-of-sale terminal), or is transferred thereto in conventional manner from mass storage medium 27. The memory contains instructions 19 for executing routines on information that is stored in several files 17 according to the present invention. The memory also includes main menu functions 23 and buffer storage or interactive display control 25 for synchronously displaying lines of data bits on display device 13 in conventional manner. Permanent records and periodic reports of product data may be plotted or printed out 31 under control of the CPU 11.

In accordance with the present invention, several files of information in data base 17 are gathered and stored regarding past demands for each of a plurality of products (e.g., cookies, buns, rolls, etc.) in each of a plurality of time periods (e.g., quarter-hour intervals per day). In addition, the data base 17 includes a product-planning master file, product planning frequency tables, rules calculation file, look-up table, a master file of demand-curve models, a master file of day types (e.g., Thanksgiving, Saturday, Superbowl day, etc.), a sales day file, a sales time file, a daily business summary file, an inventory details file, a cross-reference file, product planning work file, and location configuration file (e.g., number and types of ovens, mixers, counter area, etc.), all as more specifically described later herein. Files in the database 17 are accessed and modified under control of the CPU 11 in response to production planning routines 19 such as past demand update, product-demand pre-estimation, actual demand monitoring, and the like, as described later herein, for controlling the display on display device 13 of directions to a user for preparing specified quantities of individual products at prescribed time periods throughout the day.

Figure 2:
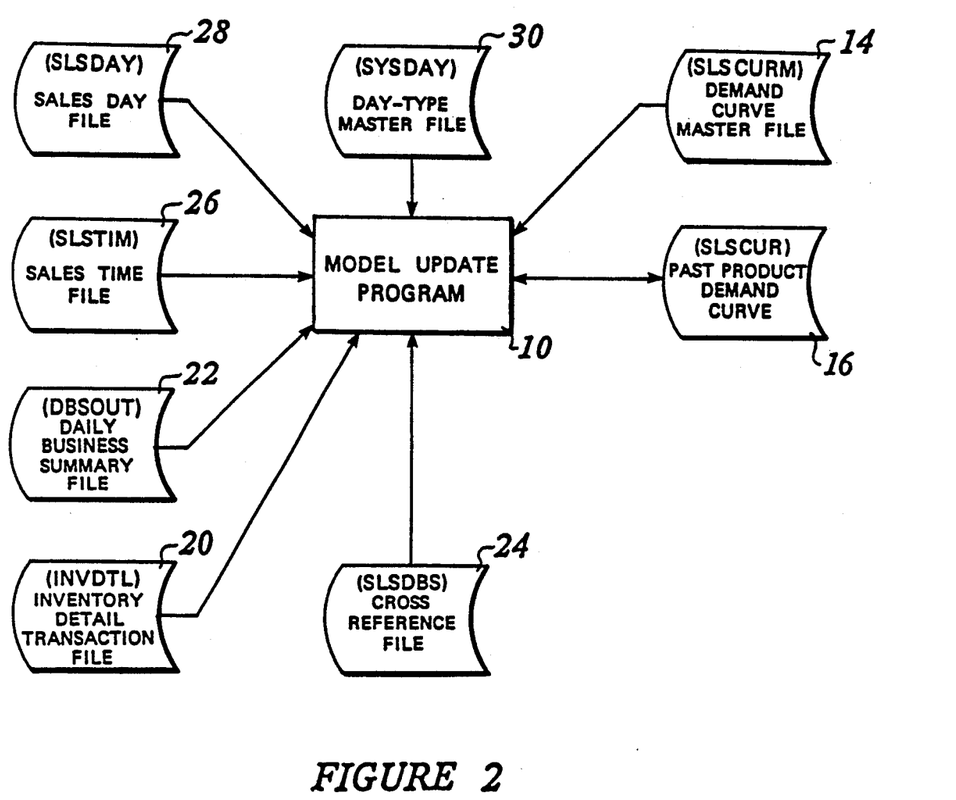
FIG. 2 is a data flow diagram showing the data used and stored during the update of past-product demand.

Referring now to FIG. 2, there is shown a block schematic diagram of a system that operates to update past-product demand data. The process 10 of updating the product demand is described in FIG. 3. The demand-curve master file 14 defines each demand curve that will be tracked within each day type. Demand curves can represent total sales, department sales, individual product item sales, or counts of any kind. For example, as many as 999 individual demand curves can be defined. The past-product demand curve 16 is a file that is used to project near-future demand for products. The inventory detail transaction file 20 contains past inventory transactions such as receivers, transfers, waste, and on-hand. This detail can be used to update the past-product demand curve 16. The daily business summary file 22 contains daily historical actual product sales or production detail which also can be used to update the past product demand curve 16. The cross-reference file 24 operates between the products demand-curve master file 14 and the daily product business summary file 22, and allows for a single product demand curve to be updated by more than one daily product business summary. The sales-time file 26 contains past actual data by time period during the day for total sales, department sales, individual product sales, or counts of any kind. The sales-day file 28 contains the day-type indicator of the recent past actual data to determine which past-product demand curve 16 to update. The day-type master file 30 defines the day-type models (e.g., Saturdays, Thanksgiving, Superbowl day, and the like) that are available to track in the system of the present invention. The file descriptions are set forth in the attached Appendix.

Figure 3:
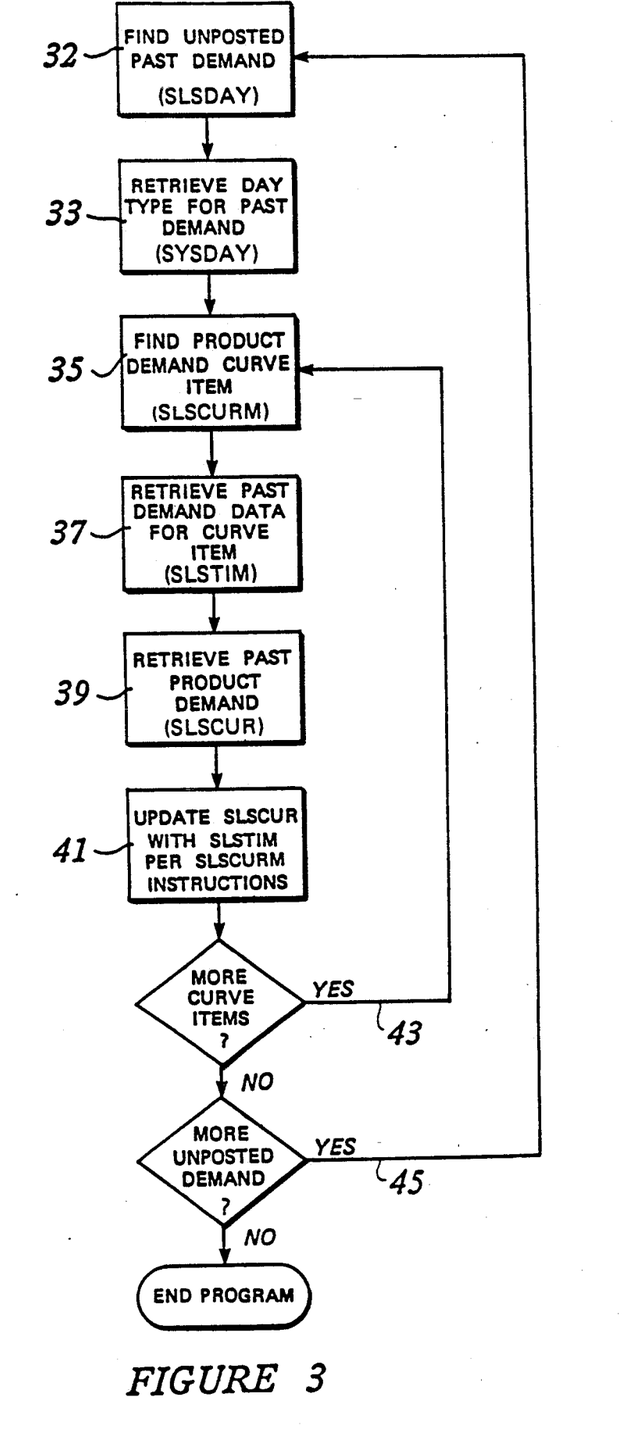
FIG. 3 is a flow chart of the process steps taken to post recent actual demand to the past-product demand curve.

Referring now to FIG. 3, there is shown a flow chart of the past-product demand routine. An unposted past demand day is determined by reading 32 the sales-day file 28 and finding an unposted day. The day-type model is retrieved 33 from the past-product demand curve 16 and the day-type master record is retrieved from the day-type master file 30. Next, the first demand curve product, or item, is retrieved 35 from the demand curve master file 14. The demand-curve master file 14 contains information regarding which recent-past actual data should be used and how it should be applied to the past-product demand curve 16. Recent-past actual data that can be accessed includes sales time file, daily product business summary, and inventory detail. Recent-past actual data is retrieved 37 from the sales time file 26 for developing a current-demand curve. The past-product demand curve 16 is retrieved 39, and the recent-past actual data is applied 41 to the past-product demand curve in accordance with the weighed percentage from the demand-curve master file 14. The updated past-product demand curve is re-written 43 to the past product demand file (SLSCUR) 16, and the day is marked 45 as posted (SLSDAY). For each demand-curve product or item in the master file 14, steps 35 through 43 are repeated. For each unposted past demand day, steps 32 through 45 are repeated.

Figure 4:
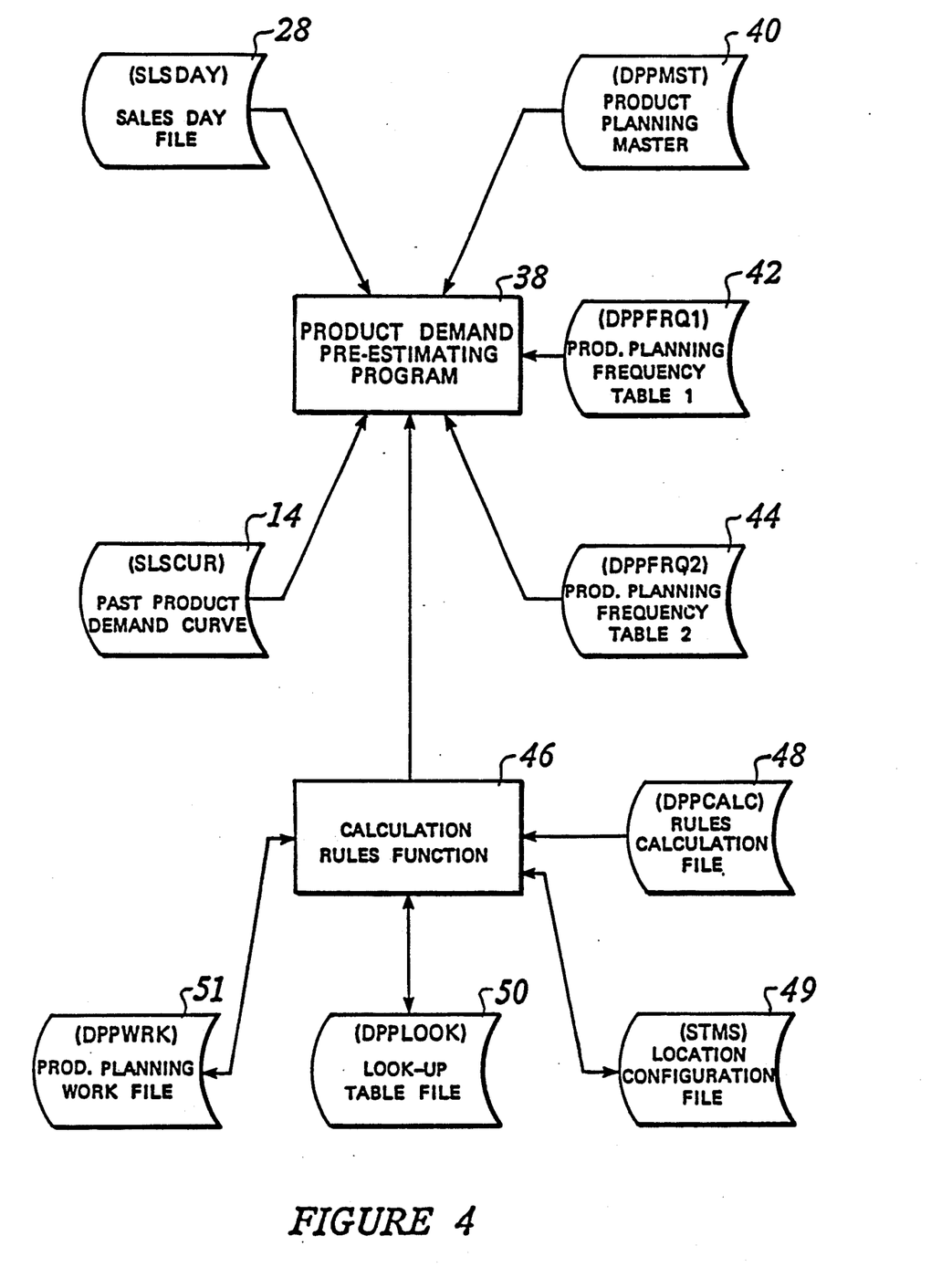
FIG. 4 is a data flow diagram showing the data used and stored during the pre-estimating of product demand for near-future periods.
Figure 5:
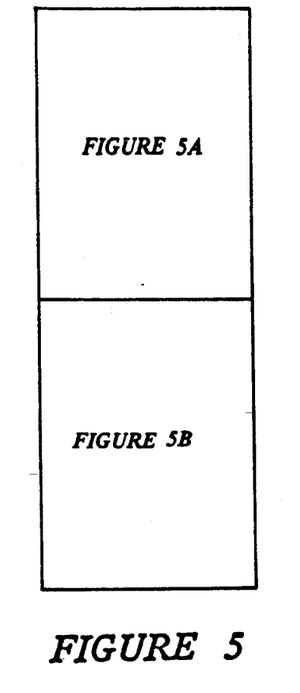
FIG. 5(comprised of 5A and 5B) is a flow chart of the process steps taken to pre-estimate product demand.
Figure 5A:
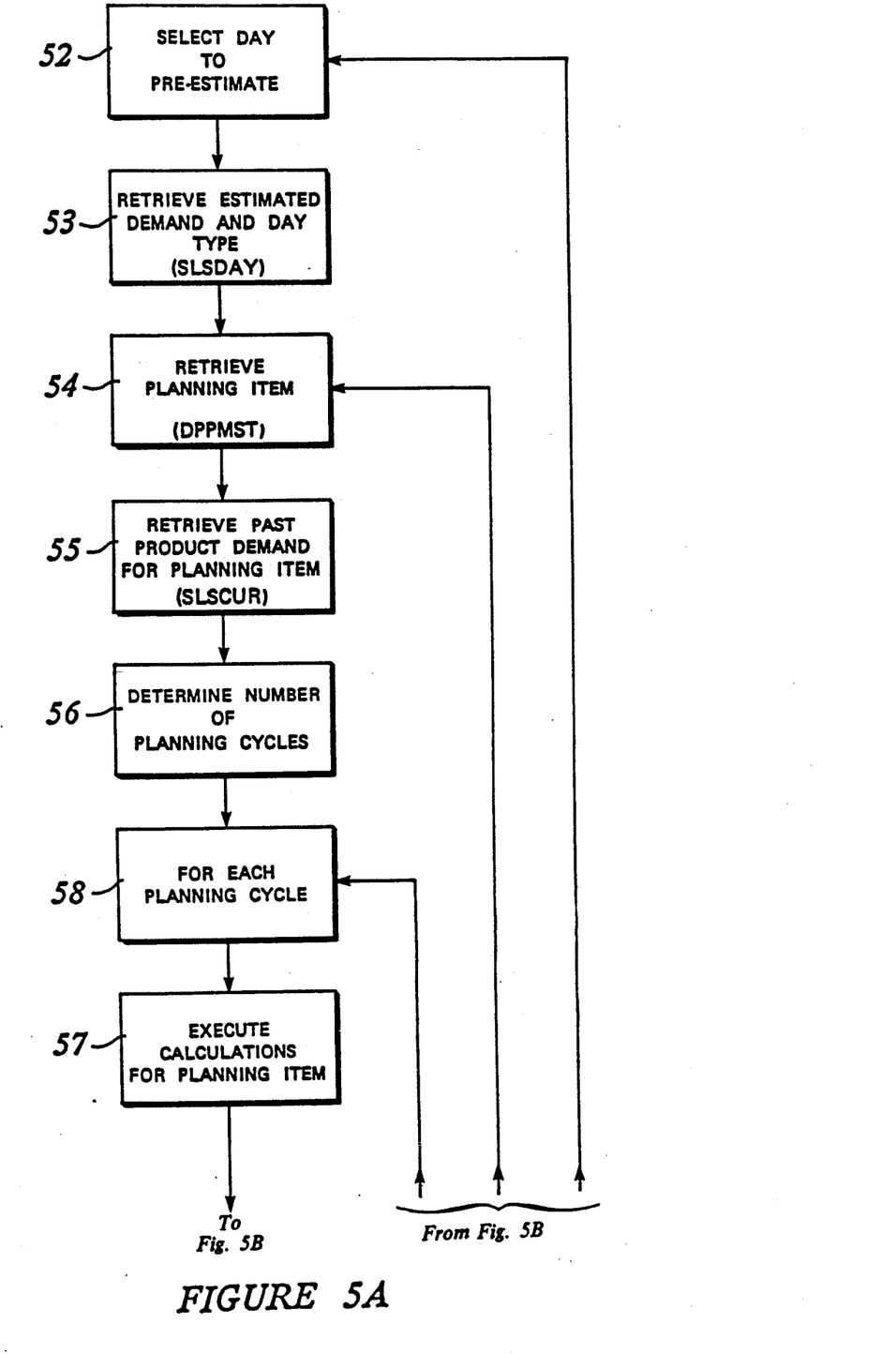
Figure 5B:
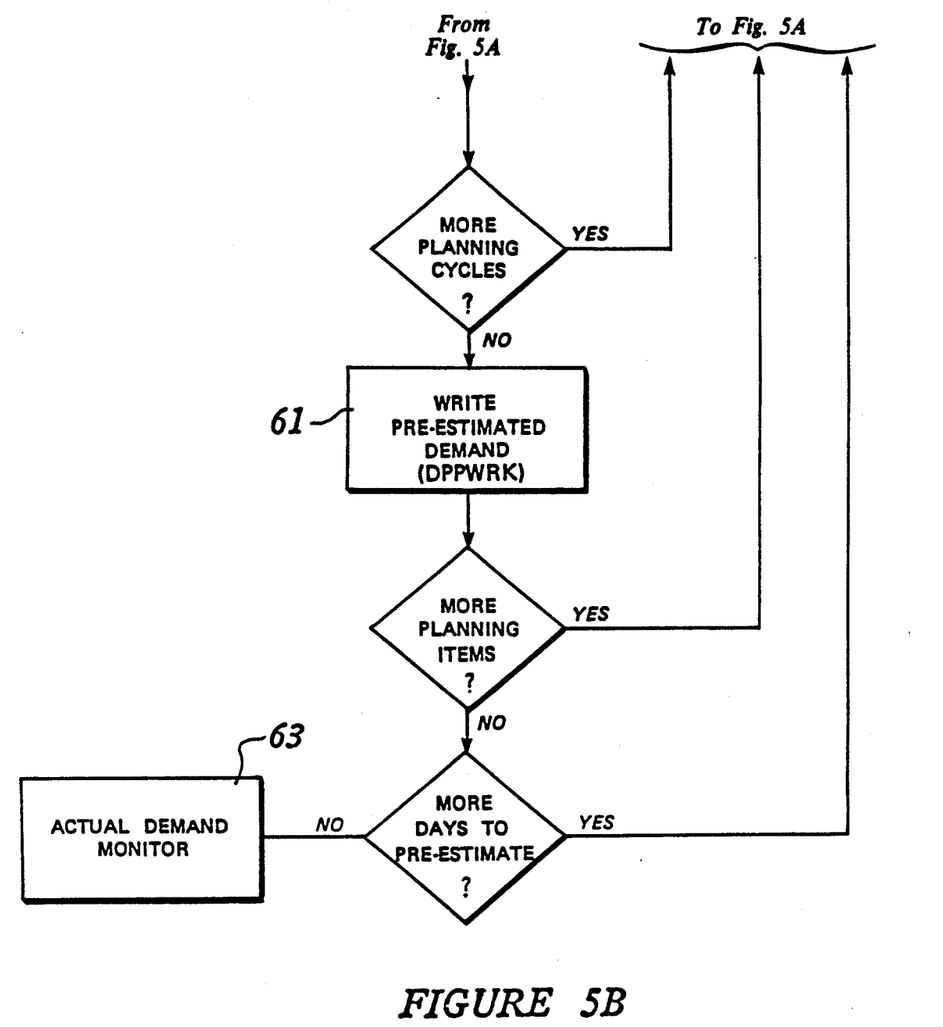

FIGS. 4 and 5 illustrate the data stored and the manipulation of that data to pre-estimate product demand for near-future periods from past-product demand. FIG. 4 illustrates the flow of data in the process of pre-estimating the product demand. The process 38 of pre-estimating the product demand is described with reference to FIG. 5. The past-product demand curve file 14 and the sales day file 28 supply data for the process 38. The sales-day file 28 contains the day-type indicator of the near-future day to determine which past-product demand curve to use when pre-estimating product demand. The product planning master file 40 defines each individual product that must be planned and information as to how and when it should be planned. It also indicates which past-product demand curve is used with this planning estimation for this product. The product-planning frequency table #1 42 defines the frequency and what time of day a product should be produced. The product-planning frequency table #2 44 defines in more detail the frequency and time of day a product should be produced.

The process 46 of applying the rules to the past-product demand curve and daily sales projections to determine the pre-estimated product demand is described at step 57 in FIG. 5. The rule calculations file 48 contains information specific to the location and can be accessed by the calculation logic in the rule calculations file 48. The look-up table file 50 contains user-defined set of values or standards in table format that can be accessed by the calculation logic in the rule calculations file 48. Such user-defined values or standards may include minimum on-hand inventory counts, and minimum percentages of total sales to be of specified products, and the like. The product planning work file 51 is used to store pre-estimated product demand and revised product demand, as shown in the file descriptions in the attached Appendix.

Referring now to FIG. 5, there is shown a flow chart illustrating the process used to pre-estimate the near-future product demand. The first day to pre-estimate is selected 52, and the estimated total demand, or sales, and the day-type model for the day are retrieved 53 from the daily sales file (SLSDAY) 28. The first product planning item is retrieved 54 from the product-planning master file (DPPMST) 40. The past-product demand curve 16 for the product planning item is retrieved 55, and the number of planning cycles is determined 56 from the product-planning master file 40 and frequency tables 42 and 44. For each planning cycle 58, the rule calculations for the planning item are executed 57. The rule calculations accumulates, for the duration of the planning cycle, the past-product demand from the past product demand curve 16 for the corresponding duration of the planning cycle and represents it as a percent of past total demand. This percent will then be applied against the current daily estimated total demand to generate the near-future product demand for the planning cycle. Once this calculation has been performed, then all other rule calculations will be applied. Other rule calculations may include, for example, location-specific values (e.g., limited by the number of ovens, etc.), look-up table values, and embedded constants and calculations. For each planning cycle, steps 57 and 58 are repeated. Once all cycles for a product planning item are calculated, the pre-estimated product demand is written 61 to the pre-estimated product work file (DPPWRK) 51. For each product planning item, steps 54 through 61 are repeated. Once pre-estimating is complete for all products, control is returned to monitoring 63 the actual demand, as illustrated in the flow chart of FIG. 6.

Figure 6:
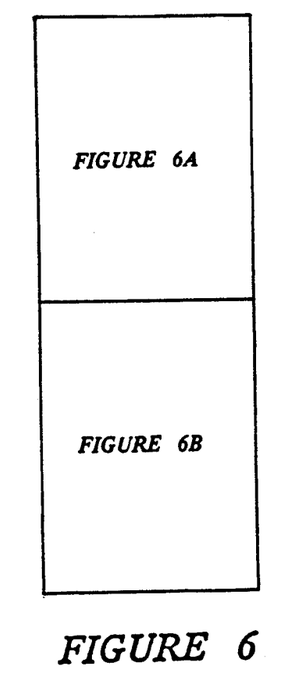
FIG. 6(comprised of 6A and 6B) is a flow chart of the process steps taken to monitor and revise near-future period product demand based on recent past periods of actual demand compared with the pre-estimate of the same recent past periods.
Figure 6A:
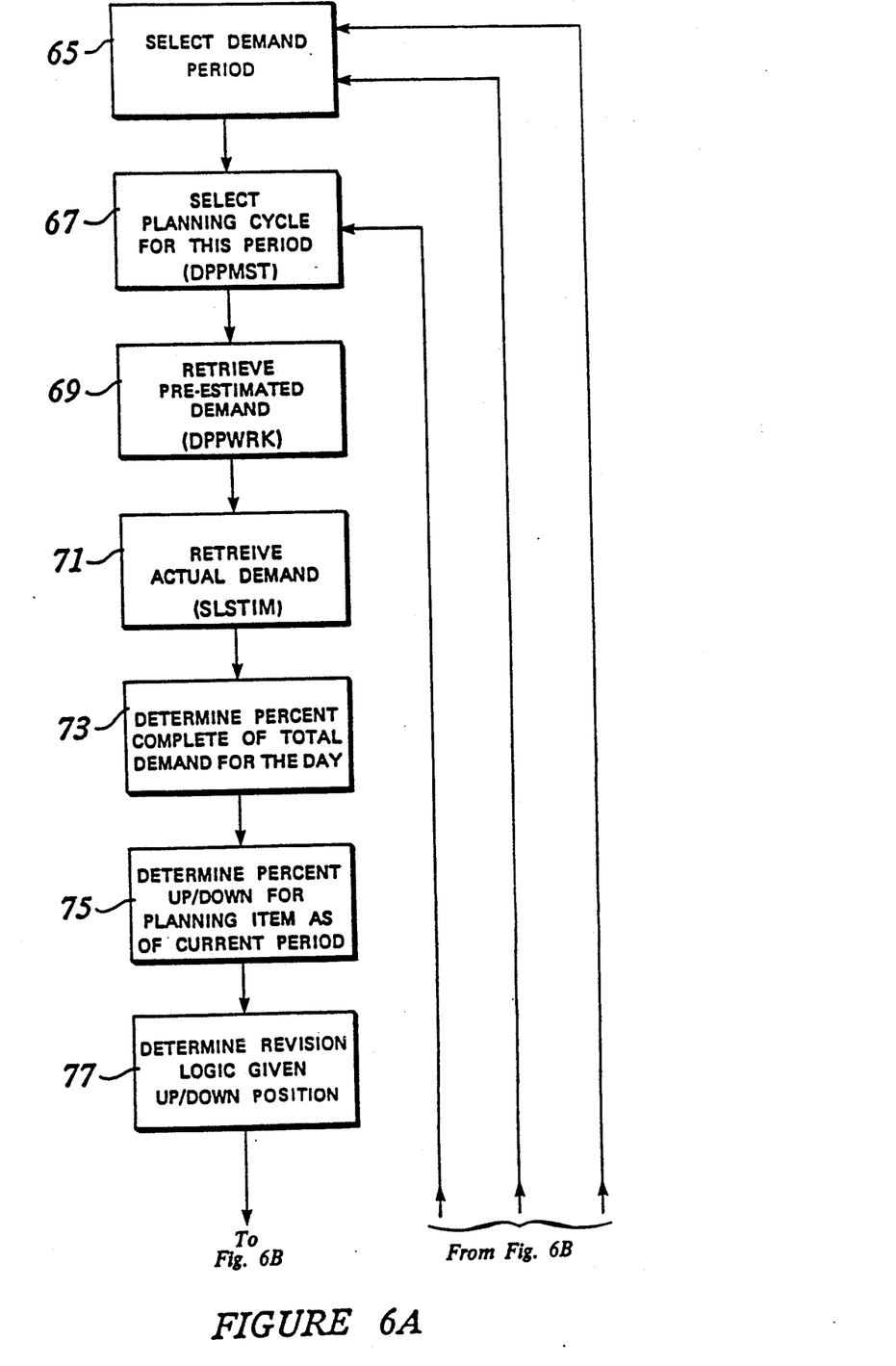
Figure 6B:
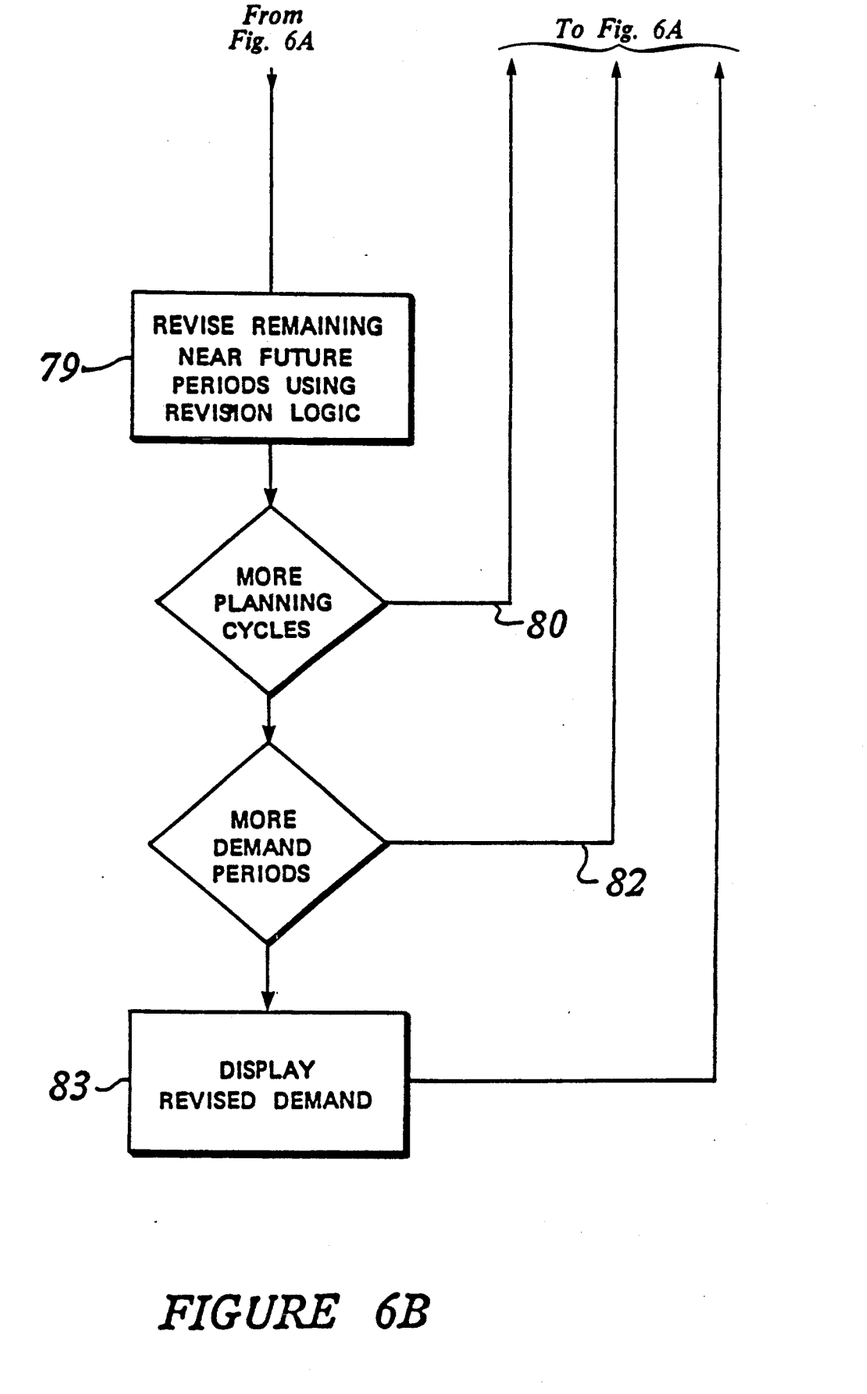

Referring now to FIG. 6, there is shown a flow chart illustrating the process of monitoring actual demand against pre-estimated demand and revising near future-periods to reflect detected variations. The first demand period (e.g., a specific day) is selected for monitoring 65, and for each demand period, a product with a cycle that falls in that demand period is selected 67. The pre-estimated demand for the product and cycle is retrieved 69 from the pre-estimated product demand work file 51. The actual demand for this product and cycle is retrieved 71 from the sales-time file 26. The percent complete of total demand for the recent past periods is calculated 73 through the current period. The percent up or down of the product item of recent past actual demand vs. corresponding recent past pre-estimated demand is calculated 75 through the current period. The particular revision logic 79 to execute is determined 77 based upon the up or down percentage of the product determined in step 75. There are upper and lower threshold limits and a growth factor defined in the location file 49. Thus, if the percent up or down of any product exceeds the upper limit, then all remaining demand periods will be revised up by the same percentage. If the percent up or down of any product is between the upper and lower limit and the up or down percentage is positive, then no revision is performed. If the percent up or down of any product is between the upper and lower limit and the up or down percent is negative then the difference between the recent past pre-estimated demand and the corresponding actual demand through the current demand period is multiplied by the reciprocal of the percent complete of total demand determined in step 73. This value is then distributed over the remaining demand periods of the day in proportion to the pre-estimated demand for the remaining periods. If the percent up or down is below the lower limit, then all remaining demand periods will be revised down the same percentage and then revised back up by the growth factor. Steps 67 through 79 are repeated for each planning cycle that occurs within this demand period. For each remaining demand period, steps 65 through 82 are repeated. All revised product demands are displayed 83 and retained until the completion of the next demand period.

Figure 7:
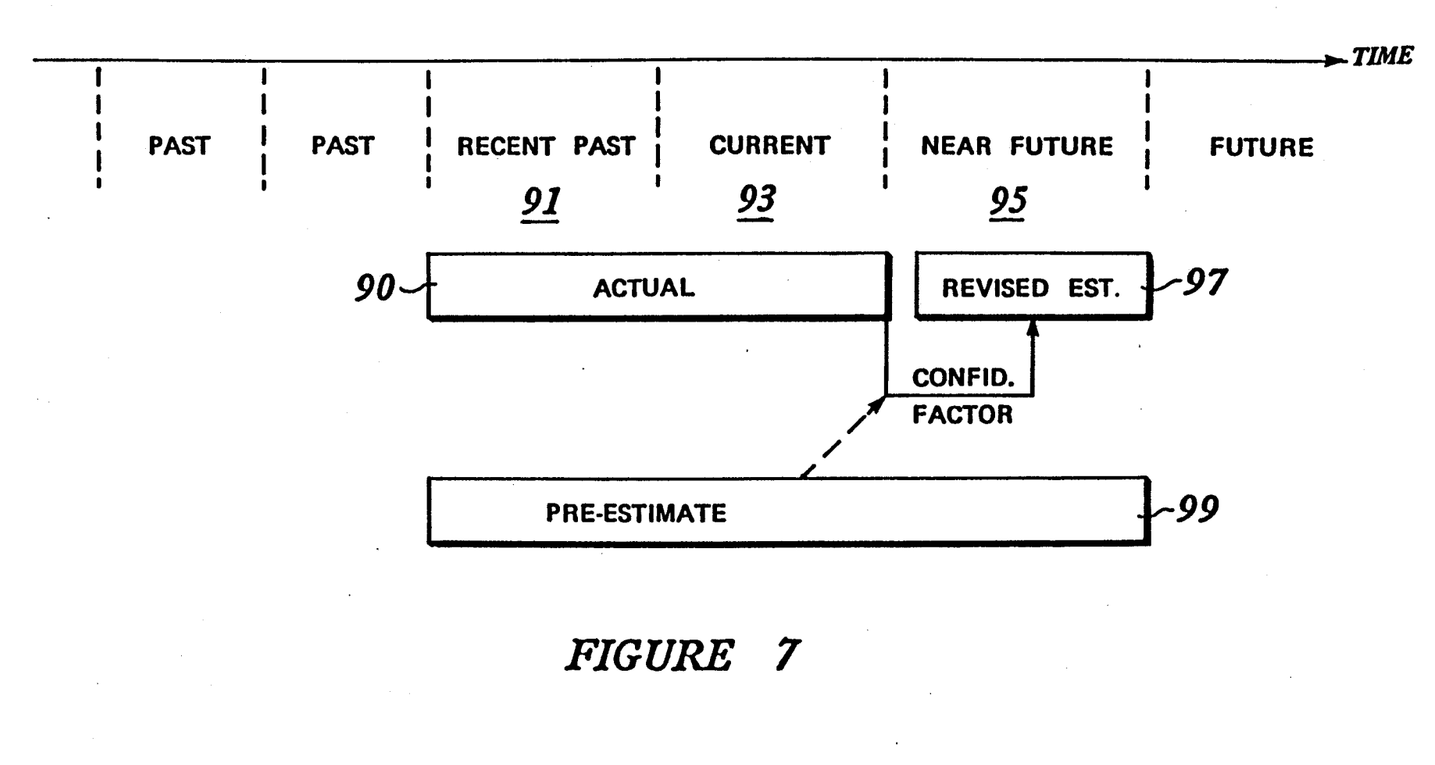
FIG. 7 is a time chart illustrating operation of the present invention.

Referring now to FIG. 7, there is shown a chart of the time periods involved in operation of the present invention. Within a given day, actual data 90 regarding product sales accumulated in the recent past period 91 and in the current period 93 are used to develop a confidence factor which is then applied to the estimate of product sales in the near-future period 95 to revise the estimate 97 from the pre-estimated demand 99 for the corresponding periods, where the pre-estimated demand for products was prepared as previously described.

APPENDIX

FILE DESCRIPTIONS-PRODUCTION PLANNER

| START | END | LENGTH | DESCRIPTION |
|---|---|---|---|
| | | | DPPWRK.DDF - Work Time File File Length = 406 file5 |
| 1 | | 6 ki | Production Date |
| 7 | | 3 ki | Production Planning Item |
| 10 | | 2 ki | Display Group Key |
| 12 | | 6 k2 | Sales Date (delete on) |
| 18 | | 192 | quantities for date (Stored as integer-2bytes) |
| 210 | | 192 | quantity on hand |
| 402 | | 5 | Filler |
| | | | DPPMST.DDF - Production Planning Master File File Length = 80 file2 |
| 1 | | 3 ki | Planning item number (don't have to be sequential but program will order sequentially) |
| 4 | | 2 k2ki | Display Group Key |
| 6 | | 1 k3 | Production Group type(0-9) (DPPCUR) |

APPENDIX-continued
FILE DESCRIPTIONS-PRODUCTION PLANNER

| START | END | LENGTH | DESCRIPTION |
|---|---|---|---|
| | | | 0-Sales |
| | | | 1-Check Count |
| | | | 2-Customer Count |
| | | | 3 to 9-reserved |
| 7 | | 1 k3 | Production Sub Group Key |
| | | | 0-Total |
| | | | 1-Dept (function of sales) |
| | | | 2-PLU (function of sales) |
| | | | 3-Other |
| | | | 0-Total Check Count |
| | | | 1-Check Count1 (function of Total Check Count) |
| | | | 2-Check Count2 (function of Total Check Count) |
| | | | 0-Total Customer count |
| | | | 1-Customer 1 (Not a function of Total Cust. Count, but a function of the total amount within this particular record) |
| | | | 2-Customer 2 (Not a function of Total Cust. Count, but a function of the total amount within this particular record) |
| | | | eg: |
| | | | total: 450 .12 .20 .05 |
| | | | cust1: 120 .25 .20 .30 |
| | | | The percentages under cust1 relate to cust1's total amount. So, to figure out the projected customers from this history: |
| | | | proj. customers * proj sales * Hist cust(120)/hist sales |
| | | | This contrasts the 0,1 groups which actually use the value 450 instead of 120 within this formula. |
| 8 | | 4 k3 | PLU number or Dept. no. or ... key (DPPCUR) |
| 12 | | 8 | Description 1 |
| 20 | | 17 | Description 2 |
| 37 | | 1 | Day/Period/Frequency (D,P,F) |
| 38 | | 1 | Day Count |
| 39 | | 1 | Relative to O,C,N (open, close noun) |
| 40 | | 2 | Offset in periods (+ −) |
| 42 | | 1 | Production Display Flag (says this item is displayed on quantity) |
| 43 | | 2 | Prep Time (whole periods) |
| 45 | | 4 | Plan Window (periods or partial periods) |
| 49 | | 5 | Time (A description field that describes time Rules) |
| 53 | | 5 | Temperature (a description field that describes temperature Rules) |
| 58 | | 4 | Unit Description (main screen) |
| 62 | | 3 | Calculation Record No. |
| 63 | | 2 | Minimum amount of product on hand |
| 67 | | 1 | On hand flag |
| 68 | | 1 | Sales flag |
| 69 | | 1 | Revise flag |
| 70 | | 10 | Filler |
| | | | DPPFRQ2.DDF - Frequency Table for Production Planning File Length = 30 file9 |
| 1 | | 3 k1 | Planning Item Number |
| 4 | | 2 k1 | Sequence number of plan |
| 6 | | 1 | Relative to O,C,N (open, close, noun) |
| 7 | | 2 | Offset (+ −) |
| 9 | | 4 | Planning window (override) |
| 13 | | 4 | Prep time (override) |
| 17 | | 3 | Calculation Record No. - (override) |
| 20 | | 11 | Filler |
| | | | DPPFRQ1.DDF - Frequency Code Lookup File File Length = 20 file14 |
| 1 | | 3 k1 | Planning item No. |
| 4 | | 4 k1 | Open time (military time) |
| 8 | | 4 k1 | Close time (military time) |
| 12 | | 3 | Frequency Code |

APPENDIX-continued
FILE DESCRIPTIONS-PRODUCTION PLANNER

| START | END | LENGTH | DESCRIPTION |
|---|---|---|---|
| 15 | | 6 | Filler |

SYSDAY.DDF - Season/Day Type File
File Length = 50 file10

| START | END | LENGTH | DESCRIPTION |
|---|---|---|---|
| 1 | | 2 k1 | Season |
| 3 | | 2 k2 | Display key |
| 5 | | 20 | Description |
| 25 | | 4 | Open Time (military time) |
| 29 | | 4 | Close Time (military time) |
| 33 | | 8 | Filler |

DPPLOOK.DDF - Lookup Table
File Length = 30 file11

| START | END | LENGTH | DESCRIPTION |
|---|---|---|---|
| 1 | | 8 k1 | Key (alpha) |
| 9 | | 10 k1 | Sent Value |
| 19 | | 10 | Return Value |
| 29 | | 2 | Filler |

DPPCAL.DDF - Calculation File
File Length = 54 file12

| START | END | LENGTH | DESCRIPTION |
|---|---|---|---|
| 1 | | 3 k1 | Key (numeric) |
| 4 | | 51 | Value |
| | | | Used in Value: T1-total projected sales |
| | | | T2-planning window sales |
| | | | D1-total projected department sales |
| | | | C[key]-another calculation record |
| | | | K1-total projected check count |
| | | | P[value,key]-look up table |
| | | | V[plan item no.]-other plans items in wrktim |
| | | | S[key]-value in STMS record with key integer and real values operands |

STMS.DDF - STORE MASTER FILE file1

| START | END | LENGTH | DESCRIPTION |
|---|---|---|---|
| 1 | 3 | 3 k1 | Key |
| 4 | 23 | 20 | Description |
| 24 | 60 | 37 | Field |

PPH - Periods per hour
position 1-3: The number of periods per hour.
DDP - Production Planner Flags

```
         1         2         3
12345678901234567890123456789012344567
M 2 6 51010 317 2
``` position 1: M means manual input (not from cash register interface)
position 2-3: daycount (the number of days to project for)
position 4-6: maximum pages on production schedule
position 7-9: The maximum number of frequency planning items
position 10-11: The percent up
position 12-13: The percent down
position 14-15: The percent growth rate
position 16-17: The maximum hours that the store will be open
position 18-19: The maximum time you can increase sales by (double, triple, 4 times, . . .)

SLSDAY.DDF - Product day sales file
File Length = 500 file3
programs: production planner, cash sheet . . .

| START | END | LENGTH | DESCRIPTION |
|---|---|---|---|
| 1 | | 6 k1 | Date |
| 7 | | 2 k2 | Season |
| 9 | | 1 | Completed flag |
| | | | 0-Nothing entered |
| | | | 1-Projected |
| | | | 2-Completed |
| | | | 3-SLSCUR Updated |
| | | | 4-Incomplete SLSTIM Data |
| 10 | | 1 | Transmission Flag |
| | | | 0-Not transmitted |
| | | | 1-Transmitted |
| 11 | | 1 | Cash Balance Flag |
| | | | 0-Not balanced |
| | | | 1-Balanced |
| 12 | | 2 | Number of Missed Sales Readings |
| 14 | | 9 | Flag Filler |
| 23 | | 10 | Projected Sales |
| 33 | | 10 | 2nd Projected Sales |
| 43 | | 8 | Projected Std Food Cost |
| 51 | | 6 | Transmission Date |

APPENDIX-continued
FILE DESCRIPTIONS-PRODUCTION PLANNER

| START | END | LENGTH | DESCRIPTION |
|---|---|---|---|
| 57 | | 4 | Transmission Time |
| 61 | | 2 | Current Period |
| 63 | | 10 | Actual Sales |
| 73 | | 8 | Actual Std Food Cost |
| 81 | | 10 | Last Year Actual Sales |
| 91 | | 5 | Customer Count |
| 96 | | 5 | Customer Check Count |
| 101 | | 10 | Permanent Operational Budget |
| 111 | | 5 | Projected Staff Hours |
| 116 | | 5 | Projected Manager Hours |
| 121 | | 5 | Projected Asst Manager Hours |
| 126 | | 5 | Projected 1st Training Hours |
| 131 | | 5 | Projected 2nd Training Hours |
| 136 | | 5 | Overtime Hours (Staff) |
| 141 | | 5 | Filler |
| 146 | | 5 | Actual Staff Hours |
| 151 | | 5 | Actual Manager Hours |
| 156 | | 5 | Actual Asst Manager Hours |
| 161 | | 5 | Actual 1st Training Hours |
| 166 | | 5 | Actual 2nd Training Hours |
| 171 | | 10 | Filler |
| 181 | | 10 | Area 1 - Total Receipts |
| 191 | | 10 | Area 2 - Non Cash Tender |
| 201 | | 10 | Area 3 - Total Cash (Deposits) |
| 211 | | 10 | Area 4 - Net Sales |
| 221 | | 10 | Area 5 - Cash Over/Short |
| 231 | | 10 | Cash Sheet Field 1-Coupons |
| 241 | | 10 | Cash Sheet Field 2-Corporate Accounts |
| 251 | | 10 | Cash Sheet Field 3-Corp Account out of Balance |
| 261 | | 10 | Cash Sheet Field 4-On Account Total |
| 271 | | 10 | Cash Sheet Field 5-Gift Certificates Redeemed |
| 281 | | 10 | Cash Sheet Field 6-Paid Outs |
| 291 | | 10 | Cash Sheet Field 7-Promotions |
| 301 | | 10 | Cash Sheet Field 8-Filler |
| 311 | | 10 | Cash Sheet Field 9-Filler |
| 321 | | 80 | Filler |

SLSTIM.DDF - Product Period Sales File - this file is loaded by sales register
File Length = 420 file4
programs : production planner

| START | END | LENGTH | DESCRIPTION |
|---|---|---|---|
| 1 | | 6 k1 | Date |
| 7 | | 1 k1 | Production Group type (0-9) (DPPCUR) |
| | | | 0-Sales |
| | | | 1-Check Count |
| | | | 2-Customer Count |
| | | | 3 to 9 - reserved |
| 8 | | 1 k1 | Production Sub Group Key |
| | | | 0-Total sales |
| | | | 1-Dept (function of sales) |
| | | | 2-PLU (function of sales) |
| | | | 3-Other (function of sales) |
| | | | 0-Total check counts |
| | | | 1-Check count1 |
| | | | 2-Check count2 |
| 9 | | 4 k1 | Production Key (plu# or dpt#) |
| 13 | | 10 | Total Sales |
| 23 | | 5 | Total Quantity |
| 28 | | 192 | Actual sales |
| 220 | | 192 | Quantity |
| 412 | | 9 | Filler |

SLSCUR.DDF - Curve File
File Length = 210 file8
programs : production planner

| START | END | LENGTH | DESCRIPTION |
|---|---|---|---|
| 1 | | 2 k1 | Season |
| 3 | | 1 k1 | Production Group type (0-9) (DPPCUR) |
| | | | 0-Sales |
| | | | 1-Check count |
| | | | 2-Customer Count |
| | | | 3 to 9-reserved |
| 4 | | 1 k1 | Production Sub Group Key |
| | | | 0-Total sales |
| | | | 1-Dept (function of sales) |
| | | | 2-PLU (function of sales) |

APPENDIX-continued

FILE DESCRIPTIONS-PRODUCTION PLANNER

| START | END | LENGTH | DESCRIPTION |
|---|---|---|---|
| | | | 3-Other (function of sales) |
| | | | 0-Total Check Count |
| | | | 1-Check Count1 (function of Total Check Count) |
| | | | 2-Check Count2 (function of Total Check Count) |
| | | | 0-Total customer count |
| | | | 1-Customer 1 |
| | | | 2-Customer 2 |
| 5 | | 4 k1 | Production Key (plu# or dpt# or inventory# or other#) |
| 9 | | 10 | Total value |
| 19 | | 192 | Curve Values (if percentage then 2 digit implied decimal. 1% is 100%, 99% is 9900% then instead of dividing by 100 divide by 10000. |
| | | | eg: 100 planning items and 96 periods. |
| | | | Total Sales: "0" + "0" + "0" |
| | | | Dept sales: "0" + "1" + dpt# |
| | | | PLU sales: "0" + "2" + plu# |
| | | | Total Customer Cnt : "1" + "0" + cust key |
| | | | Customer cnt 1: "1" + "1" + cust key |
| | | | Customer cnt 2: "1" + "2" + cust key |

What is claimed is:

1. A computer system for regulating production comprising:
   an input means for entering product data for at least one product from a production location, the product data including past product demand data, sales time data, sales day data, and product-planning frequencies, the product data existing for a plurality of production time periods, wherein product demand can fluctuate by time of day, day of the week and seasonality of the year;
   a past product demand register means for storing the past product demand data for previous time periods retrieved from the input means;
   a sales time register means for storing the sales time data for previous time periods retrieved from the input means;
   a sales day register means for storing the sales day data for previous time periods retrieved from the input means;
   a product-planning frequency register means for storing the product-planning frequency data for various time periods retrieved from the input means;
   an output register means for storing a pre-estimated product demand schedule;
   an estimation control register means for storing product demand estimation procedures;
   a data bus coupled to the register means and to the input means for storing data to and retrieving data from the register means;
   a processor coupled to the register means and to the input means, the processor retrieving the product demand estimation procedures from the estimation control register means for generating the pre-estimated product demand schedule from the past product demand data, the sales time data, the sales day data and the product-planning frequency data stored in the register means, the processor storing the pre-estimated product demand schedule in the output register means; and
   a display coupled to the processor for displaying the pre-estimated product demand schedule for a selected time period.

2. The system as recited in claim 1 further comprising:
   a revision control register means for storing product demand revision procedures, the processor retrieving the product demand revision procedures from the revision control register means for generating a revised product demand schedule by revising the pre-estimated product demand schedule in response to a trend in past product demand of a recent time period relative to the pre-estimated product demand schedule for the same timer period, the processor storing the revised product demand schedule in the output register means, and the display displaying the revised product demand schedule for a selected time period.

3. The system as recited in claim 2 further comprising:
   a modification control register means for storing product demand modification procedures, the processor retrieving the product demand modification procedures from the modification control register means for generating a modified product demand schedule by modifying the revised product demand schedule by a statistical confidence factor related to the product demand in the recent time period, the processor storing the modified product demand schedule in the output register means, and the display displaying the modified product demand schedule for a selected time period.

4. The system as recited in claim 2 wherein the product demand revision procedures revise a near-future pre-estimated product demand schedule in a selected period differently in response to different deviations of actual product demand compared with a corresponding pre-estimated product demand schedule for a recent past period.

5. The system as recited in claim 1 further comprising:
   an inventory register means for storing inventory information indicating on-hand quantities of the product, the processor using the product demand estimation procedures to generate a pre-estimated product demand schedule by logically combining the stored inventory information.

6. The system as recited in claim 1 wherein the sales day register means stores a master file of day types and associated day type indicators of past product demand on different day types.

7. The system as recited in claim 6 wherein the day type indicators specify a day type model and a demand curve for product demand for a selected day type.

8. Apparatus for regulating a production location comprising:
   an input means for entering product data for at least one product from the production location, the product data including past product demand data, sales time data, sales day data, and product-planning frequencies, the product data existing for a plurality of production time periods, wherein product demand can fluctuate by time of day, day of the week and seasonality of the year;
   a past product demand register means for storing the past product demand data for previous time periods retrieved from the input means;

a sales time register means for storing the sales time data for previous time periods retrieved from the input means;

a sales day register means for storing the sales day data for previous time periods retrieved from the input means;

a product-planning frequency register means for storing the product-planning frequency data for various time periods retrieved from the input means;

an output register means for storing a pre-estimated product demand schedule;

an estimation control register means for storing product demand estimation procedures;

a data bus coupled to the register means and to the input means for storing data to and retrieving data from the register means;

a processor coupled to the register means and to the input means, the processor retrieving the product demand estimation procedures from the estimation control register means for generating a pre-estimated product demand from the past product demand data, the sales time data, the sales day data and the product-planning frequency data stored in the register means, the processor storing the pre-estimated product demand in the output register means; and a production means coupled to the output register means for producing the product in accordance with the pre-estimated product demand for a selected time period.

9. The system as recited in claim 8 further comprising:

a revision control register means for storing product demand revision procedures, the processor retrieving the product demand revision procedures from the revision control register means for generating a revised product demand by revising the pre-estimated product demand in response to a trend in past product demand of a recent time period relative to the pre-estimated product demand for the same time period, the processor storing the revised product demand in the output register means, and the production means producing the product in accordance with the revised product demand for a selected time period.

10. The system as recited in claim 9 further comprising:

a modification control register means for storing product demand modification procedures, where the processor retrieving the product demand modification procedures from the modification control register means for generating a modified product demand by modifying the revised product demand by a statistical confidence factor related to the product demand in the recent time period, the processor storing the modified product demand in the output register means, and the production means producing the product in accordance with the modified product demand for a selected time period.

11. The system as recited in claim 9 wherein the product demand revision procedures revise a near-future pre-estimated product demand in a selected period differently in response to different deviations of actual product demand compared with corresponding pre-estimated product demand for a recent past period.

12. The system as recited in claim 8 further comprising:

an inventory register means for storing inventory information indicating on-hand quantities of the product, the processor using the product demand estimation procedures to generate a pre-estimated product demand by logically combining the stored inventory information.

13. The system as recited in claim 8 wherein the sales day register means stores a master file of day types and associated day type indicators of past product demand on different day types.

14. The system as recited in claim 13 wherein the day type indicators specify a day type model and a demand curve for product demand for a selected day type.

15. A computer-implemented method for regulating product production comprising:

receiving product data from a production location for at least one product, the product data including past product demand data, sales time data, sales day data and product-planning frequencies, the product data existing for a plurality of production time periods, wherein the product demand can fluctuate by time of day, day of the week and seasonality of the year;

storing the received past product demand data for previous time periods;

storing the received sales time data for previous time periods;

storing the received sales day data for previous time periods;

storing the received product-planning frequency data for various time periods;

storing product demand estimation procedures;

generating a pre-estimated product demand schedule in accordance with the stored product demand estimation procedures using the past product demand data, the sales time data, the sales day data and the product-planning frequency data;

storing the pre-estimated product demand schedule; and displaying the pre-estimated product demand schedule for a selected time period.

16. The compute-implemented method as recited in claim 15 further comprising the steps of:

storing product demand revision procedures;

revising the pre-estimated product demand schedule in accordance with the stored product demand revision procedures in response to a trend in past product demand of a recent time period relative to the pre-estimated product demand schedule for the same time period to create a revised product demand schedule;

storing the revised product demand schedule; and displaying the revised product demand schedule for a selected time period.

17. The computer-implemented method as recited in claim 16 further comprising the steps of:

storing product demand modification procedures;

modifying in accordance with the stored product demand modification procedures the revised product demand schedule by a statistical confidence factor related to the product demand in the recent time period to create a modified product demand schedule;

storing the modified product demand schedule; and displaying the modified product demand schedule for a selected time period.

18. The computer-implemented method as recited in claim 16 wherein the product demand revision procedures revise a near-future pre-estimated product demand schedule in a selected period differently in response to different deviations of actual product demand compared with corresponding pre-estimated product demand schedule of a recent past period.

19. The computer-implemented method as recited in claim 15 further comprising the step of storing inventory information indicating on-hand quantities of the product, where the generating step uses the product demand estimation procedures to generate a pre-estimated product demand schedule by logically combining the stored inventory information.

20. The computer-implemented method as recited in claim 15 wherein the sales day data comprises a master file of day types and associated day type indicators of past product demand on different day types.

21. The computer-implemented method as recited in claim 20 wherein the day type indicators specify a day type model and a demand curve for product demand for a selected day type.

22. A computer-implemented method for regulating the production of products by a production means comprising the steps of:
   producing quantities of at least one product at a production location;
   receiving product data from the production location for the product, the product data including past product demand data, sales time data, sales day data and product-planning frequencies, the product data existing for a plur wherein the product demand can fluctuate by time of day, day of the week and seasonality of the year;
   storing the retrieved past product demand data for previous time periods;
   storing the retrieved sales time data for previous time periods;
   storing the retrieved sales day data for previous time periods;
   storing the retrieved product-planning frequency data for varying time periods;
   storing product demand estimation procedures;
   generating a pre-estimated product demand in accordance with the stored product demand estimation procedures from the stored past product demand data, the sales time data, the sales day data and the product-planning frequency data;
   storing the pre-estimated product demand; and
   controlling the production means to produce the product in accordance with the stored pre-estimated product demand.

23. The computer-implemented method as recited in claim 22 further comprising the steps of:
   storing product demand revision procedures;
   revising in accordance with the stored product demand revision procedures the pre-estimated product demand in response to a trend in past product demand of a recent time period relative to the pre-estimated product demand for the same time period to create a revised product demand;
   storing the revised product demand; and
   controlling the production means to produce the product in accordance with the revised product demand.

24. The computer-implemented method as recited in claim 23 further comprising the steps of:
   storing product demand modification procedures;
   modifying in accordance with the stored product demand modification procedures the revised product demand by a statistical confidence factor related to the product demand in the recent time period to create a modified product demand;
   storing the modified product demand; and
   controlling the production means to produce the product in accordance with the modified product demand.

25. The computer-implemented method as recited in claim 23 wherein the product demand revision procedures revise a near-future pre-estimated product demand in a selected period differently in response to different deviations of actual product demand compared with corresponding pre-estimated product demand of a recent past period.

26. The computer-implemented method as recited in claim 22 further comprising the step of storing inventory information indicating on-hand quantities of the product, and where the generating step uses the product demand estimation procedures to generate a pre-estimated product demand by logically combining the stored inventory information.

27. The computer-implemented method as recited in claim 22 wherein the sales day data comprises a master file of day types and associated day type indicators of past product demand on different day types.

28. The computer-implemented method as recited in claim 27 wherein the day type indicators specify a day type model and demand curve for product demand for a selected day type.

* * * * *